US012626902B2

(12) United States Patent
Ha et al.

(10) Patent No.: US 12,626,902 B2
(45) Date of Patent: May 12, 2026

(54) ELECTRODE FOR RECHARGEABLE LITHIUM BATTERY, ELECTRODE ASSEMBLY AND RECHARGEABLE LITHIUM BATTERY INCLUDING THE SAME

(71) Applicant: SAMSUNG SDI CO., LTD., Yongin-si (KR)

(72) Inventors: Jaehwan Ha, Yongin-si (KR); Taejoong Kim, Yongin-si (KR); Suhyun Kim, Yongin-si (KR); Seok Gyun Park, Yongin-si (KR); Hyunhee Kim, Yongin-si (KR); Hoyong An, Yongin-si (KR); Heeeun Yoo, Yongin-si (KR); Duckhyun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 120 days.

(21) Appl. No.: 18/212,634

(22) Filed: Jun. 21, 2023

(65) Prior Publication Data

US 2024/0014374 A1 Jan. 11, 2024

(30) Foreign Application Priority Data

Jul. 8, 2022 (KR) ........................ 10-2022-0084661

(51) Int. Cl.
*H01M 4/13* (2010.01)
*H01M 4/02* (2006.01)
(Continued)

(52) U.S. Cl.
CPC ............. *H01M 4/13* (2013.01); *H01M 4/661* (2013.01); *H01M 10/052* (2013.01); *H01M 2004/021* (2013.01); *H01M 2004/028* (2013.01)

(58) Field of Classification Search
CPC ...... H01M 4/13; H01M 4/661; H01M 10/052; H01M 2004/021; H01M 2004/028;
(Continued)

(56) References Cited

U.S. PATENT DOCUMENTS 10,916,769 B2 2/2021 Su et al.
2007/0015058 A1 1/2007 Takezawa et al.
(Continued)

FOREIGN PATENT DOCUMENTS

KR 10-2007-0009447 A 1/2007
KR 2014112609 A * 9/2014 ........ H01M 10/4235
(Continued)

OTHER PUBLICATIONS

Extended European Search Report issued in corresponding EP Application No. 23174489.7, dated Nov. 17, 2023, 7 pages.

*Primary Examiner* — Daniel S Gatewood
(74) *Attorney, Agent, or Firm* — Womble Bond Dickinson (US) LLP

(57) ABSTRACT

An electrode for a rechargeable lithium battery includes: a current collector, one surface of the current collector being partitioned into a first region and a second region spaced apart from the first region; a safety functional layer on the first region; an active material layer on the first region, the safety functional layer being between the current collector and the active material layer; and an insulating layer on the second region. A length of the safety functional layer is longer than that of the active material layer, and the electrode satisfies Equation 1:

$$a>b \quad \text{Equation 1}$$

in which a is a separation distance between the active material layer and the insulating layer, and b is a separation distance between the safety functional layer and the insulating layer.

20 Claims, 6 Drawing Sheets

(51) Int. Cl.
*H01M 4/66* (2006.01)
*H01M 10/052* (2010.01)

(58) Field of Classification Search
CPC ............. H01M 4/366; H01M 10/0587; H01M 10/4235; H01M 4/0404; H01M 4/525; H01M 4/62; H01M 4/667; H01M 10/0431; H01M 10/0525; Y02E 60/10; Y02P 70/50
See application file for complete search history.

(56) References Cited

U.S. PATENT DOCUMENTS

| | | | |
|---|---|---|---|
| 2017/0047575 A1 | 2/2017 | Tsuji et al. | |
| 2020/0144605 A1* | 5/2020 | Su | H01M 4/667 |
| 2020/0411865 A1 | 12/2020 | Lee et al. | |
| 2021/0159505 A1 | 5/2021 | Kato | |

FOREIGN PATENT DOCUMENTS

| | | |
|---|---|---|
| KR | 10-2020-0090496 A | 7/2020 |
| WO | WO 2016/163114 A1 | 10/2016 |

* cited by examiner

ELECTRODE FOR RECHARGEABLE LITHIUM BATTERY, ELECTRODE ASSEMBLY AND RECHARGEABLE LITHIUM BATTERY INCLUDING THE SAME

CROSS-REFERENCE TO RELATED APPLICATION

This application claims priority to and the benefit of Korean Patent Application No. 10-2022-0084661, filed in the Korean Intellectual Property Office on Jul. 8, 2022, the entire content of which is incorporated herein by reference.

BACKGROUND

1. Field

Embodiments relate to an electrode for a rechargeable lithium battery, an electrode assembly including the same, and a rechargeable lithium battery including the same.

2. Description of the Related Art

A portable information device, such as a cell phone, a laptop, smart phone, and the like, or an electric vehicle uses a rechargeable lithium battery having high energy density and easy portability as a driving power source. Recently, research has been actively conducted to use a rechargeable lithium battery with high energy density as a driving power source or power storage power source for hybrid or electric vehicles. However, it is difficult to provide sufficient safety and reliability while reducing or minimizing the decrease in energy density during driving of a rechargeable lithium battery having high energy density.

SUMMARY

Embodiments of the present disclosure provide an electrode for a rechargeable lithium battery, an electrode assembly including the same, and a rechargeable lithium battery including the same, which are capable of securing (or providing) safety and reliability while reducing or minimizing a decrease in energy density during driving of a rechargeable lithium battery having high energy density.

In an embodiment, an electrode for a rechargeable lithium battery includes a current collector, a safety functional layer, an active material layer, and an insulating layer. One surface of the current collector is partitioned into a first region and a second region spaced apart from the first region. The safety functional layer and the active material layer are sequentially stacked on the first region, and the insulating layer is on the second region. A length of the safety functional layer is longer than that of the active material layer, and the electrode satisfies Equation 1:

$$a>b \quad \text{Equation 1}$$

in which a is a first distance and a separation distance between the active material layer and the insulating layer, and b is a second distance and is a separation distance between the safety functional layer and the insulating layer.

Another embodiment includes an electrode assembly for a rechargeable lithium battery in which the above-described electrode is any one of a negative electrode and a positive electrode.

Another embodiment includes a rechargeable lithium battery including the above-described electrode assembly and an electrolyte.

The electrode for a rechargeable lithium battery according to an embodiment, an electrode assembly including the same, and a rechargeable lithium battery may ensure safety and reliability while reducing or minimizing energy density reduction during driving.

DETAILED DESCRIPTION

Figure 1:
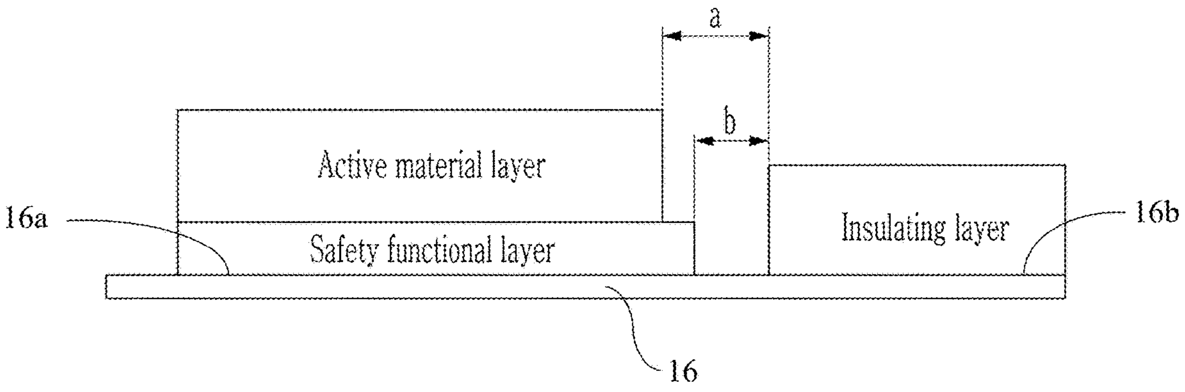
FIGS. 1 and 2 are schematic diagrams showing an electrode according to embodiments.

Hereinafter, embodiments of the present disclosure will be described, in detail, so that those of ordinary skill in the art can easily implement them. However, the present disclosure may be embodied in many different forms and should not be construed as being limited to the embodiments described herein.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

"Layer," as used herein, includes not only a shape formed on the whole surface when viewed from a plan view but also a shape formed on a partial surface.

"Particle diameter" or "average particle diameter," as used herein, may be measured by a method well known to those skilled in the art, for example, by a particle size analyzer or by a transmission electron micrograph or a scanning electron micrograph. Alternatively, an average particle diameter value may be obtained by measuring using a dynamic light scattering method, performing data analysis, counting the number of particles for each particle size range, and calculating from this. Unless otherwise defined, the average particle diameter may refer to the diameter (D50) of particles having a cumulative volume of 50 volume % in the particle size distribution.

"Thickness," as used herein, may be measured through a photograph taken with an optical microscope, such as a scanning electron microscope.

"End portion," as used herein, refers to the end or edge of any structure.

In an embodiment, an electrode for a rechargeable lithium battery includes a current collector, a safety functional layer, an active material layer, and an insulating layer. In a longitudinal direction of the current collector, one surface of the current collector is partitioned into a first region and a second region spaced apart from the first region. The safety functional layer and the active material layer are sequentially stacked on the first region, and a length of the safety functional layer is longer than that of the active material layer. The insulating layer is disposed on the second region, and the electrode satisfies the following Equation 1:

$$a>b \qquad \text{Equation 1}$$

in which a is a separation distance between the active material layer and the insulating layer (also referred to as a first distance), and b is a separation distance between the safety functional layer and the insulating layer (also referred to as a second distance).

The electrode may secure safety and reliability while minimizing a decrease in energy density during the operation of a rechargeable lithium battery including the same. For example, when a short circuit occurs in the rechargeable lithium battery including the electrode, a current does not directly flow through the current collector but flows as flows between the active material↔safety functional layer↔current collector, thereby leading to a decrease in Joule heat. Accordingly, the rechargeable lithium battery including the electrode according to embodiments of the present disclosure may ensure safety and reliability while reducing overall exothermic amount (e.g., exothermic heating) during a short circuit.

Hereinafter, a configuration of the electrode according to an embodiment will be described in detail.

Figure 2:
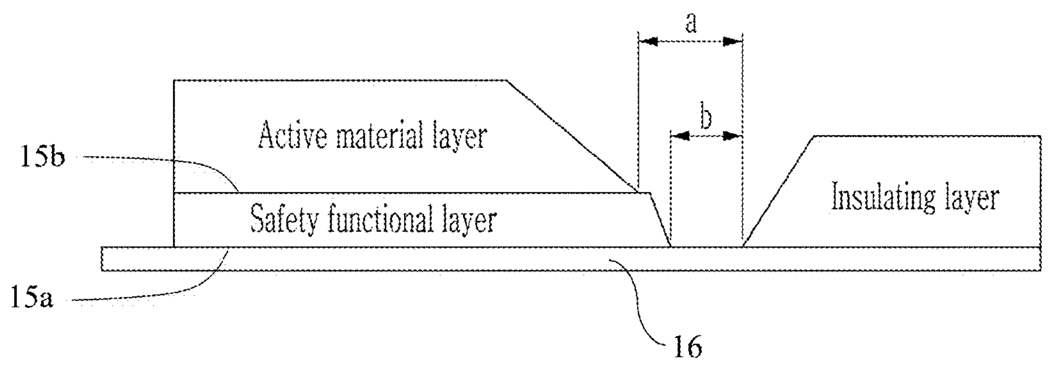

FIGS. 1 and 2 are schematic diagrams showing an electrode according to an embodiment showing the first distance (a, the separation distance between the active material layer and the insulating layer) and the second distance (b, the separation distance between the safety functional layer and the insulating layer).

The electrode may secure the safety of the rechargeable lithium battery including the same at maximum as an effect satisfying Equation 1. For example, when the electrode satisfies Equation 1, because the safety functional layer and the active material layer are sequentially stacked on the first region (e.g., 16*a*) of the current collector 16, a length of the safety functional layer is longer than that of the active material layer and a portion of the surface of the safety functional layer may be exposed without being covered by the active material layer, but the active material layer does not reach (e.g., is spaced from) the insulating layer. This electrode, as one of either the positive or the negative electrode, is used to manufacture a winding-type electrode assembly in which the safety functional layer is disposed in a curved portion of the winding-type electrode assembly to ensure the safety of the rechargeable lithium battery including the winding-type electrode assembly.

The first distance (a, the separation distance between the active material layer and the insulating layer) and the second distance (b, the separation distance between the safety functional layer and the insulating layer) may have a difference in a range of about 1 mm to about 5 mm. When the difference is within this range, safety may be maximally ensured. When the difference is less than about 1 mm, there may be lithium precipitation due to a drag phenomenon that inevitably occurs during the coating process, and when the difference is greater than about 5 mm, the safety functional layer may extend out of the curved portion of the winding-type electrode assembly and the safety thereof may be deteriorated. Accordingly, the electrode according to an embodiment satisfies the following Equation 2:

$$1\ mm \le (a-b) \le 5\ mm \quad \text{Equation 2}$$

in which the definitions of a and b are the same as described above.

For example, Equation 2 may be Equation 2-1, Equation 2-2, or Equation 2-3.

$$1.5\ mm \le (a-b) \le 4.5\ mm \quad \text{Equation 2-1}$$

$$2\ mm \le (a-b) \le 4\ mm \quad \text{Equation 2-2}$$

$$2.5\ mm \le (a-b) \le 3.5\ mm \quad \text{Equation 2-3}$$

In addition, the first distance (a, the separation distance between the active material layer and the insulating layer) may be in a range of about 1 mm to about 11 mm. When the first distance satisfies this range, even if a short circuit occurs in the winding-type electrode assembly including the electrode according to an embodiment and the rechargeable lithium battery including the winding-type electrode assembly, safety may be secured. However, when the first distance is less than about 1 mm, the active material layer, the safety functional layer, and the insulating layer may rise to cause appearance defects and lithium precipitation, and when the distance is greater than about 11 mm, the insulating layer may play an insufficient role, deteriorating the safety when if aforementioned short circuit occurs. Accordingly, the electrode according to an embodiment may satisfy the following Equation 3:

$$1\ mm \le a \le 11\ mm \quad \text{Equation 3}$$

in which the definition of a is the same as described above.

For example, Equation 3 may be Equation 3-1, Equation 3-2, or Equation 3-3.

$$2\ mm \le a \le 10\ mm \quad \text{Equation 3-1}$$

$$3\ mm \le a \le 9\ mm \quad \text{Equation 3-2}$$

$$4\ mm \le a \le 7\ mm \quad \text{Equation 3-3}$$

In addition, the second distance (b, the separation distance between the safety functional layer and the insulating layer) may be in a range of about 0 mm to about 6 mm. When the second distance satisfies this range, safety may be secured even if the short circuit occurs in the curved portion of the winding-type electrode assembly including the electrode according to the embodiment and the rechargeable lithium battery including the winding-type electrode assembly. However, the second distance cannot be less than about 0 mm, and when the second distance is greater than about 6 mm, the insulating layer may play an insufficient role, deteriorating the safety if the aforementioned circuit occurs. Accordingly, the electrode according to an embodiment may satisfy the following Equation 4:

$$0\ mm \le b \le 6\ mm \quad \text{Equation 4}$$

in which the definition of b is the same as described above.

For example, Equation 4 may be Equation 4-1, Equation 4-2, or Equation 4-3.

$$0\ mm \le b \le 9\ mm \quad \text{Equation 4-1}$$

$$1\ mm \le b \le 5\ mm \quad \text{Equation 4-2}$$

$$2\ mm \le b \le 4\ mm \quad \text{Equation 3-4}$$

The safety functional layer and the active material layer, as shown in FIG. 1, may each have a vertical end portion relative to the current collector but, as shown in FIG. 2, may have an inclined end portion relative to the current collector.

In the latter embodiment, the safety functional layer and the active material layer may each have an inclined surface in which an end portion adjacent to the insulating layer is inclined toward an outer surface from an inner surface adjacent to the current collector. For example, an end portion of the safety functional layer, as shown in FIG. 2, is inclined toward an outer surface **15*b* from an inner surface 15*a* adjacent to the current collector 16**.

This relates to a manufacturing process of the electrode. For example, each slurry for forming the safety functional layer and the active material layer may be coated while moving from one end portion not adjacent to the insulating layer to the other end portion adjacent to the insulating layer. In this process, the one end portion not adjacent to the insulating layer is vertically formed relative to the current collector, but the other end portion adjacent to the insulating layer may have an inclined surface toward the outer surface from the inner surface adjacent to the current collector.

The insulating layer may have an inclined surface such that an end portion adjacent to the safety functional layer and the active material layer is inclined toward an outer surface from an inner surface adjacent to the current collector.

This also relates to the manufacturing process of the electrode. For example, the slurry for forming an insulating layer may be respectively coated while moving from one end portion not adjacent to the safety functional layer and the active material layer to the other end portion adjacent to the safety functional layer and the active material layer. During this process, the end portion not adjacent to the safety functional layer and the active material layer is vertically formed relative to the current collector, but the other end portion adjacent to the safety functional layer and the active material layer may have an inclined surface toward the outer surface from the inner surface adjacent to the current collector.

The safety functional layer, the active material layer, and the insulating layer may each have a thickness in a range of about 0.1 μm to about 100 μm.

For example, the safety functional layer may have a thickness in a range of about 0.1 μm to about 30 μm, for example, in a range of about 0.5 μm to about 20 μm, about 1 μm to about 10 μm, about 2 μm to about 8 μm, or about 3 μm to about 5 μm. When these ranges are satisfied, the safety functional layer may sufficiently contribute to securing the safety and reliability as well as minimizing a decrease in energy density during the operation of the rechargeable lithium battery.

In addition, the active material layer may have a thickness in a range of about 5 μm to about 100 μm, for example, in a range of about 10 μm to about 90 μm, about 20 μm to about 80 μm, about 30 μm to about 70 μm, or about 40 μm to about 60 μm. Within these ranges, the active material layer may sufficiently contribute to capacity and/or output of the rechargeable lithium battery.

In addition, the thickness of the insulating layer may be about 0.5 μm to about 30 μm, for example, in a range of about 1 μm to about 25 μm, about 3 μm to about 20 μm, about 4 μm to about 15 μm, or about 5 μm to about 12 μm. Within these ranges, the insulating layer may sufficiently contribute to insulation effects during the operation of the rechargeable lithium battery.

The safety functional layer is disposed on the first region of the surface of the current collector under the active material layer. Accordingly, as described above, in the rechargeable lithium battery including the electrode, when a short circuit occurs, a current flows as follows between the active material layer↔safety functional layer↔current collector leading to a decrease in joule heat. In addition, the safety functional layer may perform the same role as the active material layer, that is, it may increase capacity or increase output.

To perform such roles, the safety functional layer may include lithium transition metal phosphate. The lithium transition metal phosphate may increase capacity or output as well as lead to a decrease in joule heat when a short circuit occurs. The safety functional layer may include a compound represented by Chemical Formula 1, a compound represented by the following Chemical Formula 2, or a combination thereof as the lithium transition metal phosphate.

$$Li_{a1}M^1_{x1}Fe_{(1-x1)}PO_4 \qquad \text{Chemical Formula 1}$$

in which $0.90 \leq a1 \leq 1.5$, $0 \leq x1 \leq 0.4$, and $M^1$ is Mg, Co, Ni, or a combination thereof.

$$Li_{a2}Mn_{x2}Fe_{(1-x2)}PO_4 \qquad \text{Chemical Formula 2}$$

in which $0.90 \leq a2 \leq 1.5$ and $0.1 \leq x2 \leq 1$.

The compound represented by Chemical Formula 1 may be a lithium iron phosphate compound. A mole fraction of lithium in Chemical Formula 1 may be appropriately adjusted between approximately 0.9 and approximately 1.5 and may be, for example, $0.90 \leq a1 \leq 1.2$ or $0.95 \leq a1 \leq 1.1$. In Chemical Formula 1, Mn may be present in addition to Fe, and its mole fraction may be $0 \leq x1 \leq 0.7$, $0 \leq x1 \leq 0.5$, $0 \leq x1 \leq 0.3$, $0 \leq x1 \leq 0.1$, or $0 \leq x1 \leq 0.05$.

The compound represented by Chemical Formula 2 may be a lithium manganese iron phosphate compound. As in Chemical Formula 2, the mole fraction of lithium in Chemical Formula 2 may be $0.90 \leq a2 \leq 1.2$ or $0.95 \leq a2 \leq 1.1$. In Chemical Formula 2, the mole fraction of manganese may be $0.2 \leq x2 \leq 0.9$, $0.3 \leq x2 \leq 0.9$, or $0.4 \leq x2 \leq 0.8$, and when $0.5 \leq x2 \leq 0.9$, lithium ion conductivity is relatively high.

For example, the safety functional layer may include $LiFePO_4$, $LiMn_{0.5}Fe_{0.5}PO_4$, $LiMnPO_4$, etc. as the lithium transition metal phosphate.

Furthermore, the safety functional layer may further include a first binder and a first conductive material.

The first binder may attach materials in the safety functional layer to each other and may adhere the functional layer to the active material layer. The first binder may include a non-water-soluble binder, a water-soluble binder, or a combination thereof.

Examples of the water-insoluble binder include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoroethylene, polyvinylidene fluoride, polyethylene, polypropylene, polyamide-imide, polyimide, or a combination thereof.

The water-soluble binder may include a rubber binder or a polymer resin binder. The rubber binder may be selected from a styrene-butadiene rubber (SBR), an acrylated styrene-butadiene rubber, an acrylonitrile-butadiene rubber (ABR), an acrylic rubber, a butyl rubber, a fluorine rubber, and a combination thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and a combination thereof.

When a water-soluble binder is used as the first binder, a cellulose-based compound for imparting viscosity may be further included. The cellulose-based compound may include one or more of carboxymethyl cellulose, hydroxypropyl methylcellulose, methyl cellulose, or alkali metal salts thereof. The alkali metal may be Na, K, or Li.

The first binder may be included in an amount of about 1 to about 15 wt % or, for example, about 4 wt % to about 11 wt % based on 100 wt % of the safety functional layer.

When the safety functional layer includes a first conductive material and a first binder, the functional layer may include about 80 wt % to about 97 wt % of the lithium transition metal phosphate, the first binder may be included in an amount of about 1 wt % to about 15 wt %, and the conductive material may be included in an amount of about 0.1 wt % to about 8 wt % based on 100 wt % of the safety functional layer. When each component of the safety functional layer satisfies the content range, the separator may remain air permeable while maximizing battery capacity.

The insulating layer is disposed on a second region (e.g., 16*b*) spaced apart from the first region on one surface of the current collector and acts as an insulator. In this regard, the insulating layer may include ceramic. For example, the ceramic may include aluminum oxide (e.g., AlO3, Al2O3, etc.), silicon dioxide (SiO2), magnesium oxide (MgO), titanium dioxide (TiO2), hafnium oxide (HfO2), tin oxide (SnO), cerium (IV) oxide (CeO2), nickel oxide (NiO), zinc oxide (ZnO), calcium oxide (CaO), zirconium oxide (ZrO2), yttrium oxide (Y2O3), silicon carbide (SiC), boehmite (AlO (OH)), or a combination thereof.

Furthermore, the insulating layer may further include a second binder.

The second binder may attach materials (e.g., the ceramics) in the insulating layer to each other and may bond the insulating layer to the current collector.

The second binder may include a non-water-soluble binder, a water-soluble binder, or a combination thereof. Descriptions of these materials is the same as that of the first binder provided above.

The second binder may be included in an amount of about 1 wt % to about wt %, for example, about 4 wt % to about 11 wt % based on 100 wt % of the insulating layer.

The electrode is a positive electrode, and the active material layer may include a positive electrode active material. The positive electrode may ensure safety and improve battery performance when issues, such as heat exposure and overcharging, occur.

The positive electrode active material may include lithiated intercalation compounds that reversibly intercalate and deintercalate lithium ions. Examples of the positive electrode active material include a compound represented by any one of the following chemical formulas:

$$Li_aPk_{1-b}X_bD_2 (0.90 \leq a \leq 1.8,\ 0 \leq b \leq 0.5);$$

$$Li_aPk_{1-b}X_bO_{2-c}D_c (0.90 \leq a \leq 1.8,\ 0 \leq b \leq 0.5,\ 0 \leq c \leq 0.05);$$

$$Li_aE_{1-b}X_bO_{2-c}D_c (0.90 \leq a \leq 1.8,\ 0 \leq b \leq 0.5,\ 0 \leq c \leq 0.05);$$

$Li_aE_{2-b}X_bO_{4-c}D_c$(0.90≤a≤1.8, 0≤b≤0.5, 0≤c≤0.05);

$Li_aNi_{1-b-c}Co_bX_cD_a$(0.90≤b≤0.5, 0≤c≤0.5, 0≤a≤2);

$Li_aNi_{1-b-c}Co_bX_cO_{2-a}T_2$(0.90≤a≤1.8, 0≤b≤0.5, 0≤c≤0.05, 0≤a≤2);

$Li_aNi_{1-b-c}Co_bX_cO_{2-a}T_2$(0.90≤a≤1.8, 0≤b≤0.5, 0≤c≤0.05, 0≤a≤2);

$Li_aNi_{1-b-c}Mn_bX_cD_a$(0.90≤a≤1.8, 0≤b≤0.5, 0≤c≤0.05, 0≤a≤2);

$Li_aNi_{1-b-c}Mn_bX_cO_{2-a}T_a$(0.90≤a≤1.8, 0≤b≤0.5, 0≤c≤0.05, 0≤a≤2);

$Li_aNi_{1-b-c}Mn_bX_cO_{2-a}T_2$(0.90≤a≤1.8, 0≤b≤0.5, 0≤c≤0.05, 0≤a≤2);

$Li_aNi_bE_cG_dO_2$(0.90≤a≤1.8, 0≤b≤0.9, 0≤c≤0.5, 0.001≤d≤0.1);

$Li_aNi_bCo_cMn_dG_eO_2$(0.90≤a≤1.8, 0≤b≤0.9, 0≤c≤0.5, 0≤d≤0.5, 0.001≤e≤0.1);

$Li_aNiG_bO_2$(0.90≤a≤1.8, 0.001≤b≤0.1);

$Li_aCoG_bO_2$(0.90≤a≤1.8, 0.001≤b≤0.1);

$Li_aMn_{1-b}G_bO_2$(0.90≤a≤1.8, 0.001≤b≤0.1);

$Li_aMn_2G_bO_4$(0.90≤a≤1.8, 0.001≤b≤0.1);

$Li_aMn_{1-g}G_gPO_4$(0.90≤a≤1.8, 0≤g≤0.5);

$QO_2$;$QS_2$;$LiQS_2$;

$V_2O_5$;$LiV_2O_5$;

$LiZO_2$;

$LiNiVO_4$;

$Li_{(3-f)}J_2(PO_4)_3$(0≤f≤2);

$Li_{(3-f)}Fe_2(PO_4)_3$(0≤f≤2); and $Li_aFePO_4$(0.90≤a≤1.8).

In the above chemical formulas, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface thereof or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a combination thereof. A method of forming the coating layer may be a method that does not adversely affect physical properties of the positive electrode active material, for example, spray coating, dipping, and the like.

The positive electrode active material may include, for example, lithium nickel composite oxide represented by the following Chemical Formula 11.

$$Li_{a11}Ni_{x11}M^{11}{}_{y11}M^{12}{}_{1-x11-y12}O_2 \qquad \text{Chemical Formula 11}$$

in which 0.9≤a11≤1.8, 0.3≤x11≤1, 0≤y11≤0.7, and $M^{11}$ and $M^{12}$ are each independently selected from Al, B, Ce, Co, Cr, F, Mg, Mn, Mo, Nb, P, S, Si, Sr, Ti, V, W, Zr, and a combination thereof.

In Chemical Formula 11, 0.4≤x11≤1 and 0≤y11≤0.6; 0.5≤x11≤1 and 0≤y11≤0.5; 0.6≤x11≤1 and 0≤y11≤0.4; 0.7≤x11≤1 and 0≤y11≤0.3; 0.8≤x11≤1 and 0≤y11≤0.2; or 0.9≤x11≤1 and 0≤y11≤0.1.

The positive electrode active material may include, for example, lithium nickel cobalt composite oxide represented by the following Chemical Formula 12.

$$Li_{a12}Ni_{x12}Co_{y12}M^{13}{}_{1-x12-y12}O_2 \qquad \text{Chemical Formula 12}$$

in which 0.9≤a12≤1.8, 0.3≤x12<1, 0<y12≤0.7, and $M^{13}$ is selected from Al, B, Ce, Cr, F, Mg, Mn, Mo, Nb, P, S, Si, Sr, Ti, V, W, Zr, and a combination thereof.

In Chemical Formula 12, 0.3≤x12≤0.99 and 0.01≤y12≤0.7; 0.4≤x12≤0.99 and 0.01≤y12≤0.6; 0.5≤x12≤0.99 and 0.01≤y12≤0.5; 0.6≤x12≤0.99 and 0.01≤y12≤0.4; 0.7≤x12≤0.99 and 0.01≤y12≤0.3; 0.8≤x12≤0.99 and 0.01≤y12≤0.2; or 0.9≤x12≤0.99 and 0.01≤y12≤0.1.

The positive electrode active material may include, for example, lithium nickel cobalt composite oxide represented by the following Chemical Formula 13.

$$Li_{a13}Ni_{x13}Co_{y13}M^{14}{}_{z13}M^{15}{}_{1-x13-y13-z13}O_2 \qquad \text{Chemical Formula 13}$$

in which 0.9≤a13≤1.8, 0.3≤x13≤0.98, 0.01≤y13≤0.69, 0.01≤z13≤0.69, $M^{14}$ is selected from Al, Mn, and a combination thereof, and $M^{15}$ is selected from B, Ce, Cr, F, Mg, Mo, Nb, P, S, Si, Sr, Ti, V, W, Zr, and a combination thereof.

In Chemical Formula 13, 0.4≤x13≤0.98, 0.01≤y13≤0.59, and 0.01≤z13≤0.59; 0.5≤x13≤0.98, 0.01≤y13≤0.49, and 0.01≤z13≤0.49; 0.6≤x13≤0.98, 0.01≤y13≤0.39, and 0.01≤z13≤0.39; 0.7≤x13≤0.98, 0.01≤y13≤0.29, and 0.01≤z13≤0.29; 0.8≤x13≤0.98, 0.01≤y13≤0.19, and 0.01≤z13≤0.19; or 0.9≤x13≤0.98, 0.01≤y13≤0.09, and 0.01≤z13≤0.09.

The positive electrode active material layer may include a positive electrode active material and may further include a third binder and/or a second conductive material. The content of the positive electrode active material may be about 90 wt % to about 98 wt %, for example, about 90 wt % to about 95 wt % based on the total weight of the positive electrode active material layer. Each content of the third binder and the second conductive material may be about 1 wt % to about 5 wt % based on the total weight of the positive electrode active material layer.

The third binder improves binding properties of positive electrode active material particles with one another and with a current collector. Examples thereof may include polyvinyl alcohol, carboxylmethyl cellulose, hydroxypropyl cellulose, diacetyl cellulose, polyvinylchloride, carboxylated polyvinylchloride, polyvinyl fluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material imparts conductivity to the electrode and any suitable material may be used as long as it does not cause chemical change in the battery and is an electron conductive material. Examples of the conductive material may include a carbon-based material, such as natural graphite, artificial graphite, carbon black, acetylene black, ketjenblack, a carbon fiber, and the like; a metal-based material of a metal powder or a metal fiber, and the like including copper, nickel, aluminum, silver, and the like; a conductive polymer, such as a polyphenylene derivative, or a mixture thereof.

An aluminum foil may be used as the positive electrode current collector but is not limited thereto.

In another embodiment, the electrode for a rechargeable lithium battery may be a negative electrode for a rechargeable lithium battery, and the inorganic particles for conducting lithium ions in the functional layer may include the compound represented by Chemical Formula 3. Lithium ions in the compound of Chemical Formula 3 may participate in a battery reaction, and thus, battery capacity may be increased and battery performance may be improved.

An embodiment includes an electrode assembly for a rechargeable lithium battery in which the aforementioned electrode is applied to any one of a negative electrode and a positive electrode.

An embodiment includes an electrode assembly for a rechargeable lithium battery in which a winding-type electrode assembly including a stack in which a negative electrode, a separator, and a positive electrode are sequentially stacked and the stack is wound. Any one electrode of the negative electrode and the positive electrode includes a current collector, a safety functional layer, an active material layer, and an insulating layer, and one surface of the current collector is partitioned into a first region and a second region spaced apart from the first region. The safety functional layer and the active material layer are sequentially stacked on the first region, and a length of the safety functional layer is longer than that of the active material layer. The insulating layer is disposed on the second region, and the electrode satisfies the following Equation 1:

$$a>b \qquad \text{Equation 1}$$

in which a is a first distance (e.g., a separation distance between the active material layer and the insulating layer), and b is a second distance (e.g., a separation distance between the safety functional layer and the insulating layer).

A winding-type electrode assembly including the aforementioned electrode as one of a positive electrode and a negative electrode may be manufactured, and the safety functional layer may be disposed on a curved portion of the winding-type electrode assembly.

Figure 3:
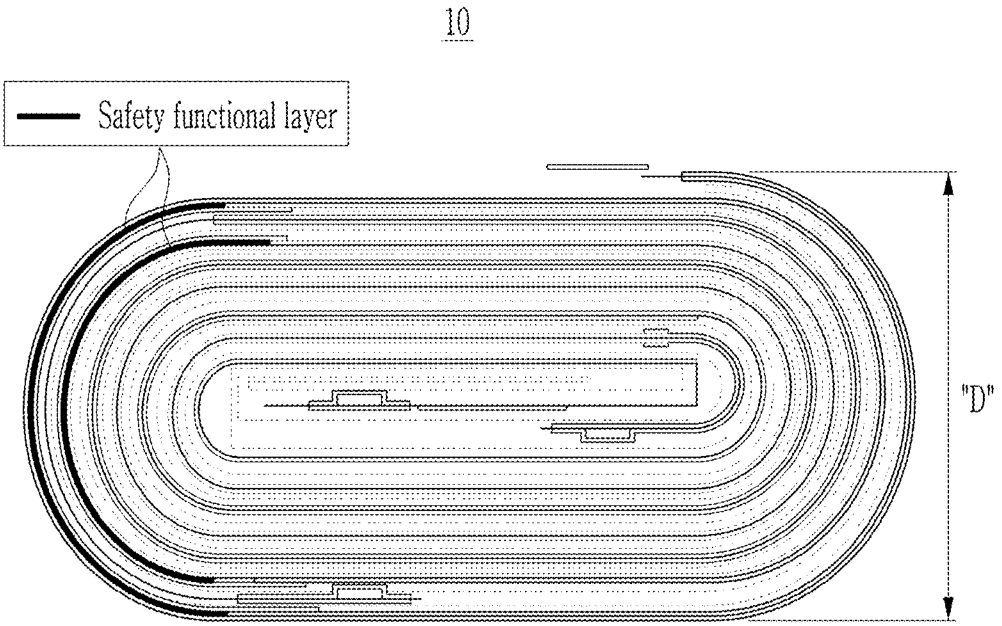
FIG. 3 is a schematic view showing an electrode assembly according to an embodiment.

FIG. 3 is a schematic view showing a winding-type electrode assembly according to an embodiment. The winding-type electrode assembly is pressed in a vertical direction (in the figure) in a state in which the stack is wound to include a first flat portion and a second flat portion extending parallel to each other and a first curved portion and a second curved portion connecting (or extending between) both sides (e.g., opposite sides) of the first and second flat portions, respectively. Herein, the safety functional layer may be disposed on the first curved portion, the second curved portion, or both.

The curved portions of the winding-type electrode assembly correspond to relatively weak portions during the safety evaluation. However, in an embodiment, a length of the safety functional layer is longer than that of the active material layer such that a portion of the surface of the safety functional layer may be exposed without being covered with the active material layer. In some embodiments, the active material layer does not reach the insulating layer. When the safety functional layer is disposed on the outmost curved portion of the electrode assembly, safety of the winding-type electrode assembly is supplemented (e.g., improved).

The first distance and a thickness of the winding-type electrode assembly have a relationship satisfying the following Equation 5:

$$1.0\ \text{mm} \le a \le \{D^*(\Pi/2)\}mm \qquad \text{Equation 5}$$

in which a is a first distance (e.g., a separation distance between the active material layer and the insulating layer), and D is the thickness of the winding-type electrode assembly (e.g., the distance between the first flat portion and the second flat portion).

In addition, the second distance and the thickness of the winding-type electrode assembly may have a relationship satisfying the following Equation 6:

$$0\ \text{mm} \le b \le \{D^*(\Pi/2)-4\}mm \qquad \text{Equation 6}$$

in which b is a second distance (e.g., a separation distance between the safety functional layer and the insulating layer), and D is a thickness of the winding-type electrode assembly (e.g., a distance between the first flat portion and the second flat portion).

In Equations 5 and 6, D may be about 1.5 mm to about 50 mm, for example, about 2 mm to about 40 mm, about 3 mm to about 30 mm, or about 4 mm to about 10 mm.

An electrode including the current collector, the safety functional layer, the active material layer, and the insulating layer may be the positive electrode. In such an embodiment, the positive electrode may secure safety and improve battery performance when issues such as heat exposure and overcharging occur.

An embodiment provides a rechargeable lithium battery including the aforementioned electrode assembly. A rechargeable lithium battery according to such an embodiment includes an electrode assembly for a rechargeable lithium battery that is a winding-type electrode assembly including a stack in which a negative electrode, a separator, and a positive electrode are sequentially stacked. Any one electrode of the negative electrode and the positive electrode includes a current collector, a safety functional layer, an active material layer, and an insulating layer. One surface of the current collector is partitioned into a first region and a second region spaced apart from the first region, and the safety functional layer and the active material layer are sequentially stacked on the first region. A length of the safety functional layer is longer than that of the active material layer, the insulating layer is disposed on the second region, and the electrode satisfies Equation 1. The rechargeable lithium battery further includes an electrolyte. Such a rechargeable lithium battery may secure safety and reliability while minimizing a decrease in energy density during driving.

Herein, the rechargeable lithium battery may be one in which the electrode according to the aforementioned embodiment is applied only to the positive electrode, only to the negative electrode, or applied to both the positive electrode and the negative electrode.

Hereinafter, a rechargeable lithium battery according to an embodiment will be described with reference to FIG. 4.

Figure 4:
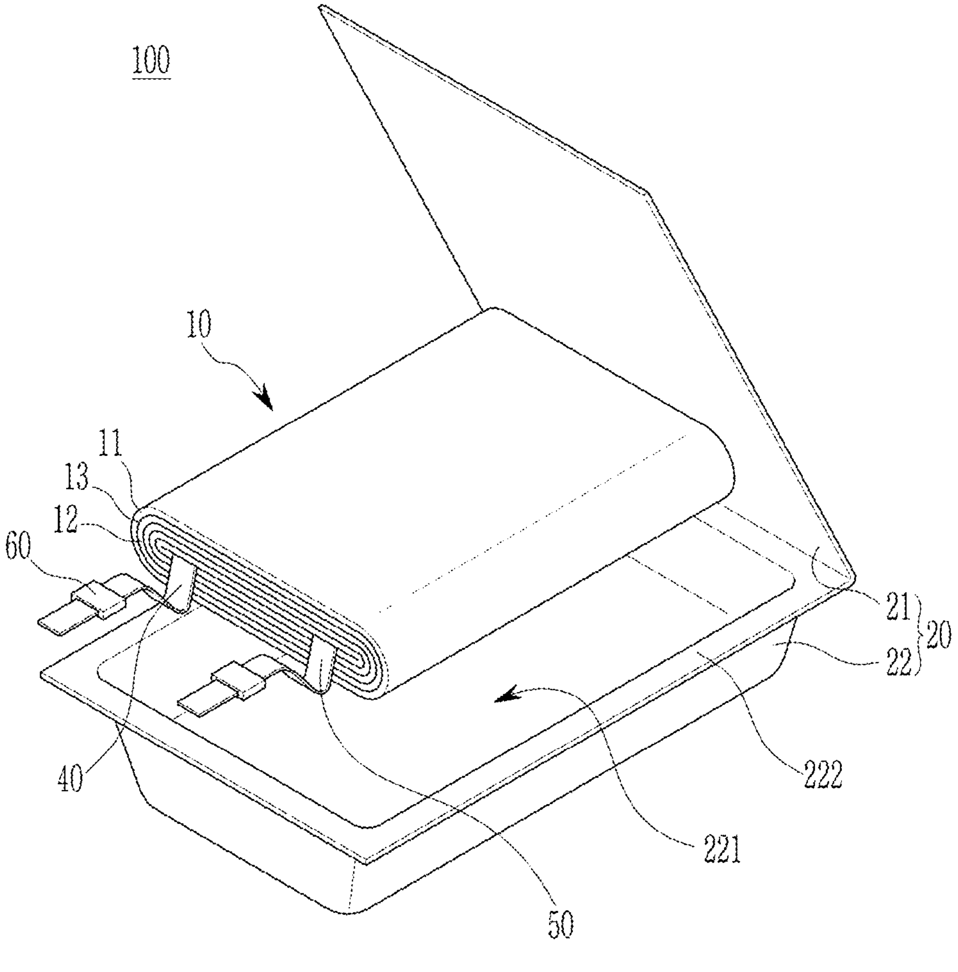
FIG. 4 schematically illustrates a rechargeable lithium battery according to an embodiment.

FIG. 4 schematically illustrates a rechargeable lithium battery according to an embodiment.

Referring to FIG. 4, the rechargeable lithium battery 100 according to an embodiment includes an electrode assembly 10, an exterior material (e.g., a case) 20 accommodating the electrode assembly 10, and a positive electrode terminal 40 and a negative electrode terminal 50 electrically connected to the electrode assembly 10.

The electrode assembly 10 includes an electrolyte that impregnates the positive electrode 11, the negative electrode 12, the separator 13 interposed between the positive electrode 11 and the negative electrode 12. The electrode assembly 10 as shown in FIG. 1, may have a structure obtained by interposing a separator 13 between band-shaped positive electrode 11 and negative electrode 12, spirally winding them, and compressing it flat. When a winding-type electrode assembly including the electrode of the aforementioned embodiment as one of a positive electrode and a negative electrode is manufactured, and the safety functional layer is disposed on a curved portion of the winding-type electrode assembly, the maximum safety of the rechargeable lithium battery including the winding-type electrode assembly may be secured.

The exterior material 20 may include (or may consist of) a lower exterior material 22 and an upper exterior material 21, and the electrode assembly 10 is housed in an internal space 221 within (or formed by) the lower exterior material 22.

After housing the electrode assembly 10 in the exterior material 20, a sealant is applied on a sealing portion 222 along the edge of the lower exterior material 22 to seal the upper exterior material 21 and the lower exterior material 22. Herein, parts of the positive electrode terminal 40 and the negative electrode terminal 50 that are in contact with the case 20 may be wrapped with an insulation member 60 to improve durability of the rechargeable lithium battery 100.

The electrolyte includes a non-aqueous organic solvent and a lithium salt.

The non-aqueous organic solvent acts as a medium for transmitting ions taking part in the electrochemical reaction of a battery. The non-aqueous organic solvent may be a carbonate-based, ester-based, ether-based, ketone-based, or alcohol-based solvent, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethyl acetate, methyl propionate, ethyl propionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran and the like and the ketone-based solvent may include cyclohexanone, and the like. In addition, the alcohol-based solvent may include ethyl alcohol, isopropyl alcohol, etc. and the aprotic solvent may include nitriles such as R—CN (wherein, R is a C2 to C20 linear, branched, or cyclic hydrocarbon group and may include a double bond, an aromatic ring, or an ether bond), and the like, amides such as dimethylformamide, dioxolanes such as 1,3-dioxolane, sulfolanes, and the like.

The non-aqueous organic solvent may be used alone or in a mixture. When the organic solvent is used in a mixture, the mixture ratio may be controlled in accordance with a desirable battery performance.

In addition, when the carbonate-based solvent is used, a mixture of a cyclic carbonate and a chain carbonate may be used. In such an embodiment, when the cyclic carbonate and the chain carbonate are mixed in a volume ratio of about 1:1 to about 1:9, the electrolyte may exhibit excellent performance.

The non-aqueous organic solvent may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

As the aromatic hydrocarbon-based solvent, an aromatic hydrocarbon-based compound represented by the following Chemical Formula I may be used.

Chemical Formula I

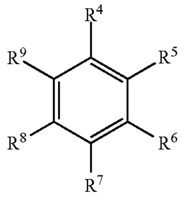

in which $R^4$ to $R^9$ are the same or different and are selected from hydrogen, a halogen, a C1 to C10 alkyl group, a haloalkyl group, and a combination thereof.

Examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound of the following Chemical Formula II to improve cycle-life of a battery.

Chemical Formula II

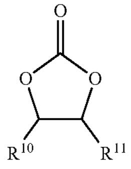

in which $R^{10}$ and $R^{11}$ are the same or different and are selected from hydrogen, a halogen, a cyano group, a nitro group, and fluorinated C1 to C5 alkyl group, provided that at least one of $R^{10}$ and $R^{11}$ is selected from a halogen, a cyano group, a nitro group, and fluorinated C1 to C5 alkyl group, but both of $R^{10}$ and $R^{11}$ are not hydrogen.

Examples of the ethylene-based carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within a suitable range.

The lithium salt dissolved in the non-aqueous organic solvent supplies lithium ions in a battery, enables basic operation of a rechargeable lithium battery, and improves transportation of the lithium ions between positive and negative electrodes.

Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide, LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein x and y are natural numbers, for example, an integer ranging from 1 to 20, lithium difluoro (bisoxolato) phosphate, LiCl, LiI, $LiB(C_2O_4)_2$ (lithium bis (oxalato) borate, LiBOB), and lithium difluoro(oxalato) borate (LiDFOB).

The lithium salt may be used in a concentration ranging from about 0.1 M to about 2.0 M. When the lithium salt is included in the above concentration range, an electrolyte may have excellent performance and lithium ion mobility due to optimal electrolyte conductivity and viscosity.

The separator 13 separates the positive electrode 14 and the negative electrode 12 and provides a transporting passage for lithium ions and may be any generally-used separator in a lithium ion battery. In other words, the separator 13 may have low resistance to ion transport and excellent impregnation for an electrolyte. For example, separator may be selected from a glass fiber, polyester, Teflon®, polyethylene, polypropylene, polytetrafluoroethylene, or a combination thereof. It may have a form of a non-woven fabric or a woven fabric. For example, in a lithium-ion battery, a polyolefin-based polymer separator, such as polyethylene and polypropylene is mainly used. To ensure the heat resistance or mechanical strength, the separator 13 may be a coated separator including a ceramic component or a polymer material may be used. In some embodiments, the separator 13 may have a mono-layered or multi-layered structure.

Rechargeable lithium batteries may be classified as lithium-ion batteries, lithium-ion polymer batteries, and lithium polymer batteries according to the presence of a separator and the type of electrolyte used therein. The rechargeable lithium batteries may have a variety of shapes and sizes, may include cylindrical, prismatic, coin, or pouch-type batteries, and may be thin film batteries or may be rather bulky in size. Structures and manufacturing methods for lithium-ion batteries pertaining to this disclosure are well known in the art.

Hereinafter, embodiments of the present disclosure and comparative examples are described. It is to be understood, however, that the following embodiments and examples are for the purpose of illustration and are not to be construed as limiting the present disclosure.

Example 1

(1) Manufacture of Positive Electrode

In Example 1, as an electrode according to an embodiment, a positive electrode having a first distance of 5 mm (a, separation distance between an active material layer and an insulating layer) and a second distance of 3 mm (b, separation distance between a safety functional layer and an insulating layer) is prepared.

A positive electrode active material slurry is prepared by mixing 95 wt % of $LiFeO_4$ as a lithium transition metal phosphate, 3 wt % of polyvinylidene fluoride as a binder, and 2 wt % of ketjenblack as a conductive material in an N-methylpyrrolidone solvent. The slurry is coated in a longitudinal (lengthwise) direction from one end portion of one surface of an aluminum current collector and dried to from a 4 μm-thick safety functional layer. Herein, a method of the coating is performed using micro gravure equipment.

A positive electrode active material slurry is prepared by mixing 95 wt % of $LiCoO_2$ as a positive electrode active material, 3 wt % of polyvinylidene fluoride as a binder, and 2 wt % of ketjenblack as a conductive material in an N-methylpyrrolidone solvent. A positive electrode active material layer having a thickness of 50 μm is manufactured by coating and drying in a longitudinal (lengthwise) direction from the end portion of the safety functional layer.

An insulating layer slurry is prepared by mixing 90 wt % of boehmite as a ceramic and 10 wt % of polyvinylidene fluoride as a binder in water as a solvent. The insulating layer slurry is coated in a longitudinal (lengthwise) direction from the other end portion of the surface of the aluminum current collector at where the safety functional layer is not present, forming a 10 μm-thick insulating layer. Herein, a method of the coating is performed by using the micro gravure equipment.

Accordingly, the positive electrode of Example 1 is obtained.

(2) Manufacture of Negative Electrode 97.3 wt % of graphite as a negative electrode active material, 0.5 wt % of denka black, 0.9 wt % of carboxylmethyl cellulose, and 1.3 wt % of styrene-butadiene rubber are mixed in an aqueous solvent, preparing negative electrode active material slurry. This slurry is coated on a copper foil and dried to form a negative electrode active material layer.

Accordingly, a negative electrode of Example 1 is obtained.

(3) Manufacture of Battery Cell

A polyethylene separator is interposed between the positive electrode and the negative electrode to manufacture a stacked body, and the stacked body is wound and pressed (e.g., pressed in a vertical direction), obtaining a winding-type electrode assembly. The positive electrode, the negative electrode, and the polyethylene separator are arranged as shown in FIG. 2 but with the safety functional layer disposed on both curved portions of the winding-type electrode assembly.

The winding-type electrode assembly is housed into a pouch, and an electrolyte prepared by adding 1.0 M $LiPF_6$ lithium salt in a solvent of ethylene carbonate and diethyl carbonate mixed in a volume ratio of 50:50 is injected thereinto, manufacturing a rechargeable lithium battery cell.

Example 2

(1) Manufacture of Positive Electrode

In Example 2, as an electrode according to an embodiment, a positive electrode having a first distance of 2 mm (a, separation distance between an active material layer and an insulating layer) and a second distance of 0 mm (b, separation distance between a safety functional layer and an insulating layer) is prepared.

A positive electrode active material slurry is prepared by mixing 95 wt % of $LiFeO_4$ as a lithium transition metal phosphate, 3 wt % of polyvinylidene fluoride as a binder, and 2 wt % of ketjenblack as a conductive material in an N-methylpyrrolidone solvent. The slurry is coated in a longitudinal (lengthwise) direction from one end portion of one surface of an aluminum current collector and dried to from a 4 μm-thick safety functional layer. Herein, a method of the coating is performed using the micro gravure equipment.

A positive electrode active material slurry is prepared by mixing 95 wt % of $LiCoO_2$ as a positive electrode active material, 3 wt % of polyvinylidene fluoride as a binder, and 2 wt % of ketjenblack as a conductive material in an N-methylpyrrolidone solvent. A positive electrode active material layer having a thickness of 50 μm is manufactured by coating and drying in a longitudinal (lengthwise) direction from the end portion of the safety functional layer.

An insulating layer slurry is prepared by mixing 90 wt % of boehmite as a ceramic and 10 wt % of polyvinylidene fluoride as a binder in water as a solvent. The insulating layer slurry is coated in a longitudinal (lengthwise) direction from the other end portion of the surface of the aluminum current collector where the safety functional layer is not present, forming a 10 μm-thick insulating layer. Herein, a method of the coating is performed by using the micro gravure equipment.

Accordingly, the positive electrode of Example 1 is obtained.

(2) Manufacture of Battery Cell

A rechargeable lithium battery cell is manufactured in the same manner as in Example 1 except that the positive electrode of Example 1 is changed into the positive electrode of Example 2.

Example 3

(1) Manufacture of Positive Electrode

In Example 3, as an electrode according to an embodiment, a positive electrode having a first distance of 8 mm (a, separation distance between an active material layer and an insulating layer) and a second distance of 3 mm (b, separation distance between a safety functional layer and an insulating layer) is prepared.

A positive electrode active material slurry is prepared by mixing 95 wt % of $LiFeO_4$ as a lithium transition metal phosphate, 3 wt % of polyvinylidene fluoride as a binder, and 2 wt % of ketjenblack as a conductive material in an N-methylpyrrolidone solvent. The slurry is coated in a longitudinal (lengthwise) direction from one end portion of one surface of an aluminum current collector and dried to from a 4 μm-thick safety functional layer. Herein, a method of the coating is performed using the micro gravure equipment.

A positive electrode active material slurry is prepared by mixing 95 wt % of $LiCoO_2$ as a positive electrode active material, 3 wt % of polyvinylidene fluoride as a binder, and 2 wt % of ketjenblack as a conductive material in an N-methylpyrrolidone solvent. A positive electrode active material layer having a thickness of 50 μm is manufactured by coating and drying in a longitudinal (lengthwise) direction from the end portion of the safety functional layer.

An insulating layer slurry is prepared by mixing 90 wt % of boehmite as a ceramic and 10 wt % of polyvinylidene fluoride as a binder in water as a solvent. The insulating layer slurry is coated in a longitudinal (lengthwise) direction from the other end portion of the surface of the aluminum current collector where the safety functional layer is not present, forming a 10 μm-thick insulating layer. Herein, a method of the coating is performed by using the micro gravure equipment.

Accordingly, the positive electrode of Example 3 is obtained.

(2) Manufacture of Battery Cell

A rechargeable lithium battery cell is manufactured in the same manner as in Example 1 except that the positive electrode of Example 1 is changed into the positive electrode of Example 3.

Example 4

(1) Manufacture of Positive Electrode

In Example 4, as an electrode according to an embodiment, a positive electrode having a first distance of 5 mm (a, separation distance between an active material layer and an insulating layer) and a second distance of 3 mm (b, separation distance between a safety functional layer and an insulating layer) is prepared.

A positive electrode active material slurry is prepared by mixing 95 wt % of $LiFeO_4$ as a lithium transition metal phosphate, 3 wt % of polyvinylidene fluoride as a binder, and 2 wt % of ketjenblack as a conductive material in an N-methylpyrrolidone solvent. The slurry is coated in a longitudinal (lengthwise) direction from one end portion of one surface of an aluminum current collector and dried to from a 2 μm-thick safety functional layer. Herein, a method of the coating is performed by using the micro gravure equipment.

A positive electrode active material slurry is prepared by mixing 95 wt % of $LiCoO_2$ as a positive electrode active material, 3 wt % of polyvinylidene fluoride as a binder, and 2 wt % of ketjenblack as a conductive material in an N-methylpyrrolidone solvent. A positive electrode active material layer having a thickness of 50 μm is manufactured by coating and drying in a longitudinal (lengthwise) direction from the end portion of the safety functional layer.

An insulating layer slurry is prepared by mixing 90 wt % of boehmite as a ceramic and 10 wt % of polyvinylidene fluoride as a binder in water as a solvent. The insulating layer slurry is coated in a longitudinal (lengthwise) direction from the other end portion of the surface of the aluminum current collector where the safety functional layer is not present to form a 15 μm-thick insulating layer. Herein, a method of the coating is performed by using the micro gravure equipment.

Accordingly, the positive electrode of Example 4 is obtained.

(2) Manufacture of Battery Cell

A rechargeable lithium battery cell is manufactured in the same manner as in Example 1 except that the positive electrode of Example 1 is changed into the positive electrode of Example 4.

Example 5

(1) Manufacture of Positive Electrode

In Example 5, as an electrode according to an embodiment, a positive electrode having a first distance of 5 mm (a, separation distance between an active material layer and an insulating layer) and a second distance of 3 mm (b, separation distance between a safety functional layer and an insulating layer) is prepared.

A positive electrode active material slurry is prepared by mixing 95 wt % of $LiFeO_4$ as a lithium transition metal phosphate, 3 wt % of polyvinylidene fluoride as a binder, and 2 wt % of ketjenblack as a conductive material in an N-methylpyrrolidone solvent. The slurry is coated in a longitudinal (lengthwise) direction from one end portion of one surface of an aluminum current collector and dried to from a 15 μm-thick safety functional layer. Herein, a method of the coating is performed by using the micro gravure equipment.

A positive electrode active material slurry is prepared by mixing 95 wt % of $LiCoO_2$ as a positive electrode active material, 3 wt % of polyvinylidene fluoride as a binder, and 2 wt % of ketjenblack as a conductive material in an N-methylpyrrolidone solvent. A positive electrode active material layer having a thickness of 50 μm is manufactured by coating and drying in a longitudinal (lengthwise) direction from the end portion of the safety functional layer.

An insulating layer slurry is prepared by mixing 90 wt % of boehmite as a ceramic and 10 wt % of PVDF as a binder in a water solvent. The insulating layer slurry is coated in a longitudinal (lengthwise) direction from the other end of the surface of the aluminum current collector where the safety functional layer is not present, forming a 5 μm-thick insulating layer. Herein, a method of the coating is performed by using the micro gravure equipment.

Accordingly, the positive electrode of Example 5 is obtained.

(2) Manufacture of Battery Cell

A rechargeable lithium battery cell is manufactured in the same manner as in Example 1 except that the positive electrode of Example 1 is changed into the positive electrode of Example 5.

Comparative Example 1

(1) Manufacture of Positive Electrode

In Comparative Example 1, a positive electrode having a first distance of 0 mm (a, separation distance between an active material layer and an insulating layer) and a second distance of 0 mm (b, separation distance between a safety functional layer and an insulating layer) is prepared.

A positive electrode active material slurry is prepared by mixing 95 wt % of $LiFeO_4$ as a lithium transition metal phosphate, 3 wt % of polyvinylidene fluoride as a binder, and 2 wt % of ketjenblack as a conductive material in an N-methylpyrrolidone solvent. The slurry is coated in a longitudinal (lengthwise) direction from one end portion of one surface of an aluminum current collector and dried to from a 4 μm-thick safety functional layer. Herein, a method of the coating is performed by using the micro gravure equipment.

A positive electrode active material slurry is prepared by mixing 95 wt % of $LiCoO_2$ as a positive electrode active material, 3 wt % of polyvinylidene fluoride as a binder, and 2 wt % of ketjenblack as a conductive material in an N-methylpyrrolidone solvent. A positive electrode active material layer having a thickness of 50 μm is manufactured by coating and drying in a longitudinal (lengthwise) direction from the end portion of the safety functional layer.

An insulating layer slurry is prepared by mixing 90 wt % of boehmite as a ceramic and 10 wt % of PVDF as a binder in a water solvent. The insulating layer slurry is coated in a longitudinal (lengthwise) direction from the other end portion of the surface of the aluminum current collector where the safety functional layer is not present to form a 10 μm-thick insulating layer. Herein, a method of the coating is performed by using the micro gravure equipment.

Accordingly, the positive electrode of Comparative Example 1 is obtained.

(2) Manufacture of Battery Cell

A rechargeable lithium battery cell is manufactured in the same manner as in Example 1 except that the positive electrode of Example 1 is changed into the positive electrode of Comparative Example 1.

Comparative Example 2

(1) Manufacture of Positive Electrode

In Comparative Example 2, a positive electrode having a first distance of 3 mm (a, separation distance between an active material layer and an insulating layer) and a second distance of 3 mm (b, separation distance between a safety functional layer and an insulating layer) is prepared.

A positive electrode active material slurry is prepared by mixing 95 wt % of $LiFeO_4$ as a lithium transition metal phosphate, 3 wt % of polyvinylidene fluoride as a binder, and 2 wt % of ketjenblack as a conductive material in an N-methylpyrrolidone solvent. The slurry is coated in a longitudinal (lengthwise) direction from one end portion of one surface of an aluminum current collector and dried to from a 4 μm-thick safety functional layer. Herein, a method of the coating is performed by using the micro gravure equipment.

A positive electrode active material slurry is prepared by mixing 95 wt % of $LiCoO_2$ as a positive electrode active material, 3 wt % of polyvinylidene fluoride as a binder, and 2 wt % of ketjenblack as a conductive material in an N-methylpyrrolidone solvent. A positive electrode active material layer having a thickness of 50 μm is manufactured by coating and drying in a longitudinal (lengthwise) direction from the end portion of the safety functional layer.

An insulating layer slurry is prepared by mixing 90 wt % of boehmite as a ceramic and 10 wt % of PVDF as a binder in a water solvent. The insulating layer slurry is coated in a longitudinal (lengthwise) direction from the other end portion of the surface of the aluminum current collector where the safety functional layer is not present, forming a 10 μm-thick insulating layer. Herein, a method of the coating is performed by using the micro gravure equipment.

Accordingly, the positive electrode of Comparative Example 2 is obtained.

(2) Manufacture of Battery Cell

A rechargeable lithium battery cell is manufactured in the same manner as in Example 1 except that the positive electrode of Example 1 is changed into the positive electrode of Comparative Example 2.

Comparative Example 3

(1) Manufacture of Positive Electrode

In Comparative Example 3, a positive electrode having a first distance of 1 mm (a, separation distance between an active material layer and an insulating layer) and a second distance of 3 mm (b, separation distance between a safety functional layer and an insulating layer) is prepared.

A positive electrode active material slurry is prepared by mixing 95 wt % of $LiFeO_4$ as a lithium transition metal phosphate, 3 wt % of polyvinylidene fluoride as a binder, and 2 wt % of ketjenblack as a conductive material in an N-methylpyrrolidone solvent. The slurry is coated in a longitudinal (lengthwise) direction from one end portion of one surface of an aluminum current collector and dried to from a 4 μm-thick safety functional layer. Herein, a method of the coating is performed by using the micro gravure equipment.

A positive electrode active material slurry is prepared by mixing 95 wt % of $LiCoO_2$ as a positive electrode active material, 3 wt % of polyvinylidene fluoride as a binder, and 2 wt % of ketjenblack as a conductive material in an N-methylpyrrolidone solvent. A positive electrode active material layer having a thickness of 50 μm is manufactured by coating and drying in a longitudinal (lengthwise) direction from the end portion of the safety functional layer.

An insulating layer slurry is prepared by mixing 90 wt % of boehmite as a ceramic and 10 wt % of PVDF as a binder in a water solvent. The insulating layer slurry is coated in a longitudinal (lengthwise) direction from the other end portion of the surface of the aluminum current collector where the safety functional layer is not present, forming a 10 μm-thick insulating layer. Herein, a method of the coating is performed by using the micro gravure equipment.

Accordingly, the positive electrode of Comparative Example 3 is obtained.

(2) Manufacture of Battery Cell

A rechargeable lithium battery cell is manufactured in the same manner as in Example 1 except that the positive electrode of Example 1 is changed into the positive electrode of Comparative Example 3.

Evaluation Example: Safety and Reliability Evaluation (1) Bending Safety Evaluation The rechargeable battery cells according to Examples 1 to 5 and Comparative Examples 1 to 3 are charged to a maximum voltage and then, bent to and the results are shown in Table 1.

The rechargeable battery cells according to Examples 1 to 5 and Comparative Examples 1 to 3 were evaluated based on the following criteria. Ten rechargeable battery cell specimens were evaluated according to the following criteria by counting the number of the cells having L2 or less, and the results are shown as a percentage.

L0: No influence on appearance
L1: Leakage, external temperature <150° C.
L2: external temperature <200° C.
L3: Fuming, external temperature >200° C.
L4: Flame
L5: Explosion (2) Dropping Safety Evaluation The rechargeable battery cells according to Examples 1 to 5 and Comparative Examples 1 to 3 were dropped 204 times onto concrete from a height of 1.8 m at 20° C.±5° C. The battery cells were oriented to receive impacts at several places, and each battery cell was respectively tested 34 times at top/bottom/upper right corner/right lower corner/left upper corner/left lower corner, and the results are shown in Table 1.

(3) Bending Safety Evaluation after High-Temperature Cycle-Life Evaluation

The rechargeable battery cells according to Examples 1 to 5 and Comparative Examples 1 to 3 were constant current-charged to a maximum voltage at a 0.5 C rate and subsequently cut off at a 0.02 C rate in the constant voltage mode while maintaining the maximum voltage at a high temperature of 45° C. Subsequently, the cells were discharged to a voltage of 3.0 V at a 0.5 C rate, and this charge and discharge cycle was repeated 400 times. The cells were evaluated with respect to 90° bending safety after completing the high-temperature cycle-life evaluation, and the results are shown in Table 1.

TABLE 1

| | Structure | | | | | | Evaluation | | |
|---|---|---|---|---|---|---|---|---|---|
| | positive electrode | | | | | | | | |
| | Separation distance (mm) | | | Thickness (μm) | | Electrode assembly | | | bending after high-temperature cycle-life |
| | a | b | a − b | Safety functional layer | Insulating layer | Thickness (μm) | bending (%) | Dropping (%) | (%) |
| Ex. 1 | 5 | 3 | 2 | 4 | 10 | 4.7 | 100 | 100 | 100 |
| Ex. 2 | 2 | 0 | 2 | 4 | 10 | 4.7 | 100 | 100 | 100 |
| Ex. 3 | 8 | 5 | 3 | 4 | 10 | 4.7 | 100 | 100 | 100 |
| Ex. 4 | 5 | 3 | 2 | 2 | 15 | 4.7 | 100 | 100 | 100 |
| Ex. 5 | 5 | 3 | 2 | 15 | 5 | 4.7 | 100 | 100 | 100 |

TABLE 1-continued

| | Structure: positive electrode: Separation distance (mm) a | b | a − b | Thickness (μm): Safety functional layer | Insulating layer | Electrode assembly Thickness (μm) | Evaluation: bending (%) | Dropping (%) | bending after high-temperature cycle-life (%) |
|---|---|---|---|---|---|---|---|---|---|
| Comp. Ex. 1 | 0 | 0 | 0 | 4 | 10 | 4.7 | 100 | 90 | 50 |
| Comp. Ex. 2 | 3 | 3 | 0 | 4 | 10 | 4.7 | 90 | 90 | 20 |
| Comp. Ex. 3 | 1 | 3 | −2 | 4 | 10 | 4.7 | 90 | 90 | 10 |

Referring to Table 1, the rechargeable lithium battery cells according to Examples 1 to 5 exhibit excellent safety and reliability compared with the rechargeable lithium battery cells according to Comparative Examples 1 to 3. For example, the rechargeable lithium battery cells of Examples 1 to 5 remain safe even after the bending and dropping and maintain safety reliability after driving at a high temperature for a long period (high-temperature cycle-life). The reason for this maintained safety reliability is that the positive electrodes of Examples 1 to 5 are manufactured to satisfy the conditions (Equation 1) of an embodiment, and an electrode assembly and a rechargeable lithium battery cell including the same are manufactured. To analyze why safety and reliability are reduced in Comparative Examples 1 to 3, the rechargeable lithium battery cells of Comparative Examples 1 to 3 were evaluated with respect to cycle-life and then disassembled to analyze the negative electrodes. It was found that the negative electrodes (after the cycle-life evaluation) of Comparative Examples 1 to 3 exhibit lithium dendrites. In the positive electrodes of Comparative Examples 1 to 3, because the distance between a safety functional layer and an insulating layer does not satisfy the conditions of an embodiment (Equation 1), the positive electrodes have unstable adhesion with the negative electrodes, generating the lithium dendrites. Lithium dendrites are known to cause ignition during an internal short circuit of a rechargeable lithium battery.

Figure 5:
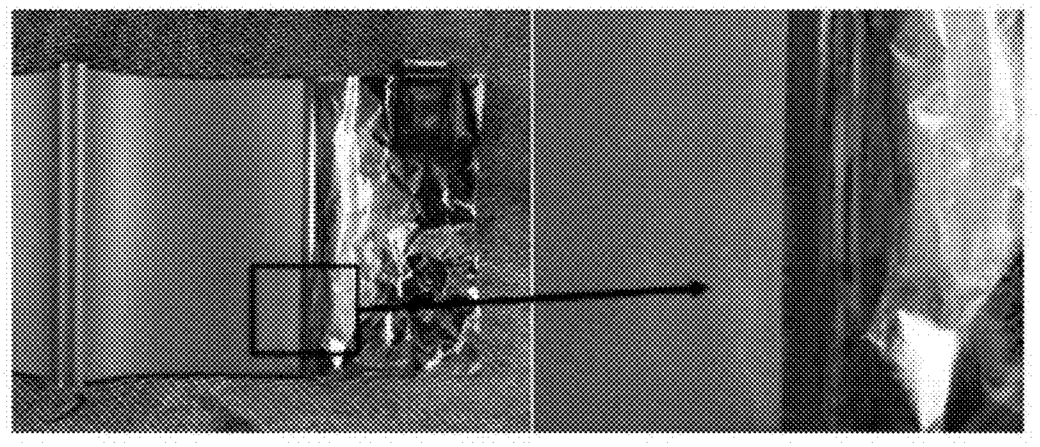
FIG. 5 is an image of a negative electrode of Comparative Example 1 after cycle-life evaluation.
Figure 6:
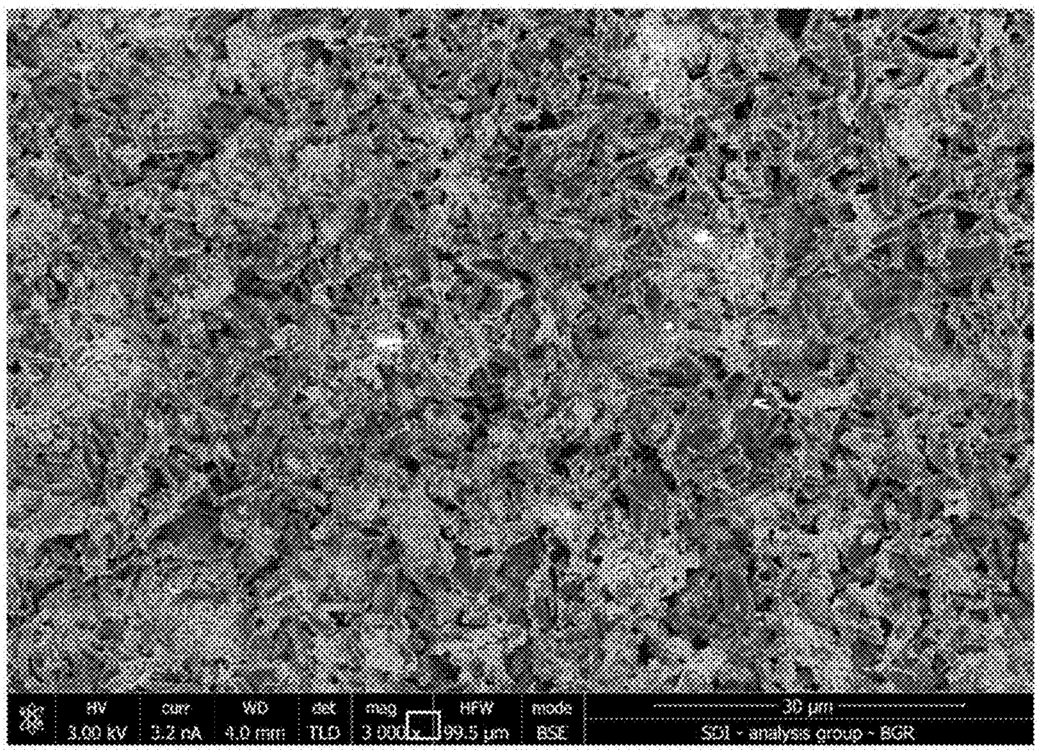
FIG. 6 is a SEM image of the negative electrode of Comparative Example 1 after cycle-life evaluation.

An image taken with an ordinary camera of the negative electrode (after the cycle-life evaluation) of Comparative Example 1 is shown in FIG. 5; and an SEM image thereof is shown in FIG. 6. At the right-side image of FIG. 5, which is an enlarged view of a part of the left-side image of FIG. 5, and the SEM image of FIG. 6, the lithium dendrites are visible on the surface of the negative electrode (after the cycle-life evaluation) of Comparative Example 1.

While this disclosure has been described in connection with what is presently considered to be practical embodiments, it is to be understood that the present disclosure is not limited to the disclosed embodiments. The present disclosure is intended to cover various modifications and equivalent arrangements included within the spirit and scope of the appended claims and their equivalents.

| Description of Some Reference Symbols | |
|---|---|
| 100: rechargeable lithium battery | 11: positive electrode |
| 12: negative electrode | 13: separator |

-continued

| Description of Some Reference Symbols | |
|---|---|
| 20: exterior material | 10: electrode assembly |
| 40: positive terminal | 50: negative terminal |
| 22: lower exterior material | 21: upper exterior material |
| 221: internal space | 222: sealing portion |
| 60: insulation member | |

What is claimed is:

1. An electrode for a rechargeable lithium battery, comprising a current collector, a safety functional layer, an active material layer, and an insulating layer;

wherein one surface of the current collector is partitioned into a first region and a second region spaced apart from the first region;

the safety functional layer and the active material layer are sequentially stacked on the first region, and a length of the safety functional layer is longer than that of the active material layer;

the insulating layer is disposed on the second region; and the electrode satisfies Equation 1:

$$a>b \qquad \text{[Equation 1]}$$

wherein, in Equation 1, a is a first distance, and a separation distance between the active material layer and the insulating layer; and b is a second distance, and is a separation distance between the safety functional layer and the insulating layer.

2. The electrode for a rechargeable lithium battery of claim 1, wherein the electrode satisfies Equation 2:

$$1\ \text{mm} \leq (a-b) \leq 5\ \text{mm} \qquad \text{[Equation 2]}$$

wherein, in Equation 2, definitions of a and b are the same as in claim 1.

3. The electrode for a rechargeable lithium battery of claim 1, wherein the electrode satisfies Equation 3:

$$1\ \text{mm} \leq a \leq 11\ \text{mm} \qquad \text{[Equation 3]}$$

wherein, in Equation 3, the definition of a is the same as in claim 1.

4. The electrode for a rechargeable lithium battery of claim 1, wherein the electrode satisfies Equation 4:

$$0\ \text{mm} \leq b \leq 6\ \text{mm} \quad \text{[Equation 4]}$$

wherein, in Equation 4, the definition of b is the same as in claim 1.

5. The electrode for a rechargeable lithium battery of claim 1, wherein the safety functional layer, the active material layer and the insulating layer each independently gradually decrease in area from the inner side adjacent to the current collector toward the outer side.

6. The electrode for a rechargeable lithium battery of claim 5, wherein the safety functional layer and the active material layer each independently have an inclined surface in which an end portion adjacent to the insulating layer is inclined toward an outer surface from an inner surface adjacent to the current collector.

7. The electrode for a rechargeable lithium battery of claim 5, wherein the insulating layer has an inclined surface that an end portion adjacent to the safety functional layer and the active material layer is inclined toward an outer surface from an inner surface adjacent to the current collector.

8. The electrode for a rechargeable lithium battery of claim 1, wherein the safety functional layer, the active material layer, and the insulating layer each independently have a thickness of about 0.1 to about 100 μm.

9. The electrode for a rechargeable lithium battery of claim 1, wherein the safety functional layer includes lithium transition metal phosphate.

10. The electrode for a rechargeable lithium battery of claim 9, wherein the safety functional layer further includes a first binder and a first conductive material.

11. The electrode for a rechargeable lithium battery of claim 1, wherein the insulating layer includes a ceramic.

12. The electrode for a rechargeable lithium battery of claim 1, wherein the electrode is a positive electrode, and the active material layer includes a positive electrode active material.

13. The electrode for a rechargeable lithium battery of claim 1, wherein the active material layer further includes a second binder and a second conductive material.

14. An electrode assembly for a rechargeable lithium battery being a winding-type electrode assembly comprising a stack in which a negative electrode, a separator, and a positive electrode are sequentially stacked, and the stack is wound;

wherein any one electrode of the negative electrode and the positive electrode includes a current collector, a safety functional layer, an active material layer, and an insulating layer;

one surface of the current collector is partitioned into a first region and a second region spaced apart from the first region;

the safety functional layer and the active material layer are sequentially stacked on the first region, and a length of the safety functional layer is longer than that of the active material layer;

the insulating layer is disposed on the second region; and the electrode satisfies Equation 1:

$$a > b \quad \text{[Equation 1]}$$

wherein, in Equation 1, a is a first distance, and a separation distance between the active material layer and the insulating layer; and b is a second distance, and is a separation distance between the safety functional layer and the insulating layer.

15. The electrode assembly for a rechargeable lithium battery of claim 14, wherein the winding-type electrode assembly is pressed in a vertical direction in a state in which the stack is wound, so as to include a first flat portion and a second flat portion extending parallel to each other and a first curved portion and a second curved portion connecting both sides of the first and second flat portions, respectively, and the safety functional layer is disposed on the first curved portion, the second curved portion, or both.

16. The electrode assembly for a rechargeable lithium battery of claim 15, wherein the electrode assembly satisfies Equation 5:

$$1.0\ \text{mm} \leq a \leq \{D*\Pi/2)\}\ \text{mm} \quad \text{[Equation 5]}$$

wherein, in Equation 5, a is a first distance, and a separation distance between the active material layer and the insulating layer, and D is a thickness of the winding-type electrode assembly and is the distance between the first flat portion and the second flat portion.

17. The electrode assembly for a rechargeable lithium battery of claim 15, wherein the electrode assembly satisfies Equation 6:

$$0\ \text{mm} \leq b \leq \{D*(\Pi/2)-4\}\ \text{mm} \quad \text{[Equation 6]}$$

wherein, in Equation 6, b is a second distance, and is a separation distance between the safety functional layer and the insulating lay; and D is a thickness of the winding-type electrode assembly and is the distance between the first flat portion and the second flat portion.

18. The electrode assembly for a rechargeable lithium battery of claim 16 or claim 17, wherein D is about 1.5 to about 50 mm.

19. The electrode assembly for a rechargeable lithium battery of claim 14, wherein the electrode including the current collector, the safety functional layer, the active material layer and the insulating layer is the positive electrode.

20. A rechargeable lithium battery comprising the electrode assembly of claim 14 and an electrolyte.

* * * * *